United States Patent
Kim

(10) Patent No.: US 9,647,248 B2
(45) Date of Patent: May 9, 2017

(54) SECONDARY BATTERY

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: Samsung SDI Co., Ltd., Yongin-Si, Gyeonggi-do (KR); Robert Bosch GmbH, Stuttgart (DE)

( * ) Notice: Subject to any disclaimer, the term of this patent is extended or adjusted under 35 U.S.C. 154(b) by 267 days.

(21) Appl. No.: 14/022,277

(22) Filed: Sep. 10, 2013

(65) Prior Publication Data
US 2014/0212743 A1    Jul. 31, 2014

(30) Foreign Application Priority Data
Jan. 28, 2013  (KR) ......................... 10-2013-0009506

(51) Int. Cl.
| H01M 2/06 | (2006.01) |
| H01M 2/22 | (2006.01) |
| H01M 2/30 | (2006.01) |

(52) U.S. Cl.
CPC .............. *H01M 2/06* (2013.01); *H01M 2/22* (2013.01); *H01M 2/30* (2013.01)

(58) Field of Classification Search
CPC ...................................... H01M 2/06
See application file for complete search history.

(56) References Cited

U.S. PATENT DOCUMENTS

| 2011/0244310 A1* | 10/2011 | Kim ................... H01M 2/0212 429/158 |
| 2011/0281155 A1 | 11/2011 | Ito et al. |
| 2012/0021278 A1* | 1/2012 | Byun ................. H01M 2/0473 429/179 |
| 2012/0100420 A1 | 4/2012 | Byun et al. |
| 2012/0183817 A1* | 7/2012 | Guen et al. ..................... 429/61 |
| 2013/0295420 A1* | 11/2013 | Guen et al. ..................... 429/61 |

FOREIGN PATENT DOCUMENTS

| JP | 09-092259 | 4/1997 |
| JP | 2007-179803 A | 7/2007 |
| KR | 10-2011-0126538 A | 11/2011 |
| KR | 10-2012-0041877 A | 5/2012 |

OTHER PUBLICATIONS

Korean Registration Determination dated Dec. 20, 2016.

* cited by examiner

*Primary Examiner* — Barbara Gilliam
*Assistant Examiner* — Nathanael Zemui
(74) *Attorney, Agent, or Firm* — Lee & Morse, P.C.

(57) ABSTRACT

A secondary battery including an electrode assembly; a case accommodating the electrode assembly; a cap plate sealing the case; a terminal plate on the cap plate; a current collecting terminal penetrating through the cap plate and the terminal plate, the current collecting terminal being coupled with a top surface of the terminal plate and being electrically connected to the electrode assembly; and a reinforcing plate coupled with a bottom surface of the terminal plate to face the terminal plate.

17 Claims, 8 Drawing Sheets

SECONDARY BATTERY

CROSS-REFERENCE TO RELATED APPLICATION

Korean Patent Application No. 10-2013-0009506 filed on Jan. 28, 2013, in the Korean Intellectual Property Office, and entitled: "SECONDARY BATTERY," is incorporated by reference herein in its entirety.

BACKGROUND

1. Field

Embodiments relate to a secondary battery.

2. Description of the Related Art

A secondary battery is a battery that is chargeable and dischargeable, unlike a primary battery that is not chargeable. A secondary battery may be used as an energy source for, e.g., a mobile device, an electric vehicle, a hybrid vehicle, an electric bicycle, an uninterruptible power supply (UPS), etc. According to type of an external device for application, a secondary battery may be used as a single battery or a battery module in which a plurality of secondary batteries are electrically connected to one another as a single unit may be used.

SUMMARY

Embodiments are directed to a secondary battery.

The embodiments may be realized by providing a secondary battery including an electrode assembly; a case accommodating the electrode assembly; a cap plate sealing the case; a terminal plate on the cap plate; a current collecting terminal penetrating through the cap plate and the terminal plate, the current collecting terminal being coupled with a top surface of the terminal plate and being electrically connected to the electrode assembly; and a reinforcing plate coupled with a bottom surface of the terminal plate to face the terminal plate.

The reinforcing plate may have a plate shape.

The reinforcing plate may include a metal different from a metal that constitutes the terminal plate.

The current collecting terminal may penetrate through, in an order as follows: the cap plate, the reinforcing plate, and the terminal plate, and may include a portion that is exposed on the top surface of the terminal plate.

An upper end portion of the current collecting terminal may include a flange structure that expands in a lateral direction and press-contacts the top surface of the terminal plate.

The flange structure may be formed by riveting the upper end portion of the current collecting terminal.

The terminal plate may include a main body facing the reinforcing plate; and at least one combining unit protruding from the main body, the at least one combining unit being inserted into a penetration hole in the reinforcing plate.

The combining unit may protrude toward a bottom surface of the reinforcing plate via the penetration hole of the reinforcing plate, and may include a flange structure that press-contacts the bottom surface of the reinforcing plate.

The flange structure may be formed by riveting the combining unit of the terminal plate.

The terminal plate may include at least two combining units, the at least two combining units being formed at different locations on the terminal plate.

The secondary battery may further include a connecting terminal on the reinforcing plate, the connecting terminal penetrating through the terminal plate and including a portion that is exposed on the top surface of the terminal plate.

An upper end portion of the connecting terminal protruding from the top surface of the terminal plate may include a spiral groove for screw attachment.

The connecting terminal may be formed of a same metal as that of the reinforcing plate.

The connecting terminal may be integrated with the reinforcing plate as a single body.

The current collecting terminal may penetrate through the terminal plate, may press-contact the top surface of the terminal plate, and may be coupled with the terminal plate.

The reinforcing plate may be interposed between the terminal plate and the cap plate.

The reinforcing plate may be assembled from below the terminal plate, and a combining unit protruding from the bottom surface of the terminal plate may penetrate through the reinforcing plate and press-contacts a bottom surface of the reinforcing plate, thereby combining the reinforcing plate and the terminal plate to each other.

The secondary battery may further include an insulation member interposed between the cap plate and the reinforcing plate, the insulation member surrounding side surfaces of an interface between the reinforcing plate and the terminal plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
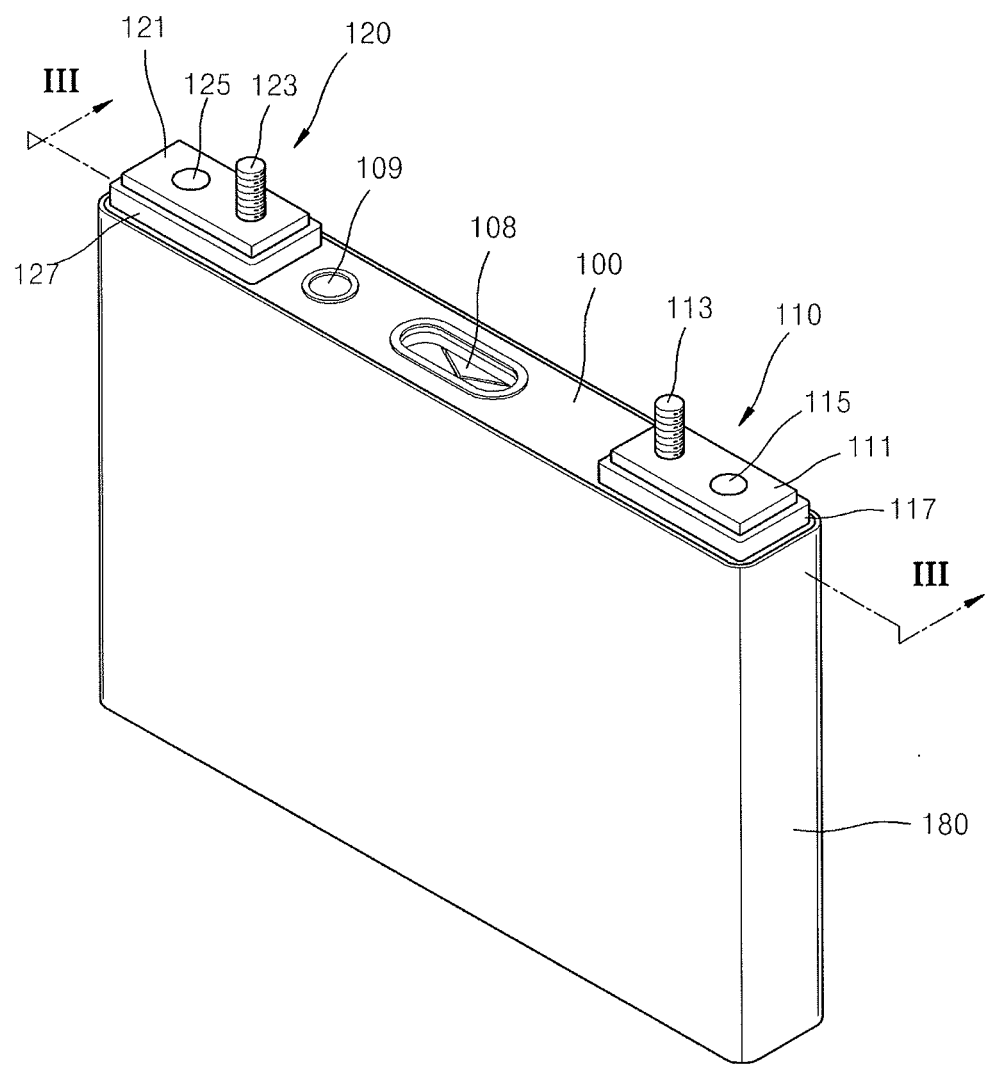
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
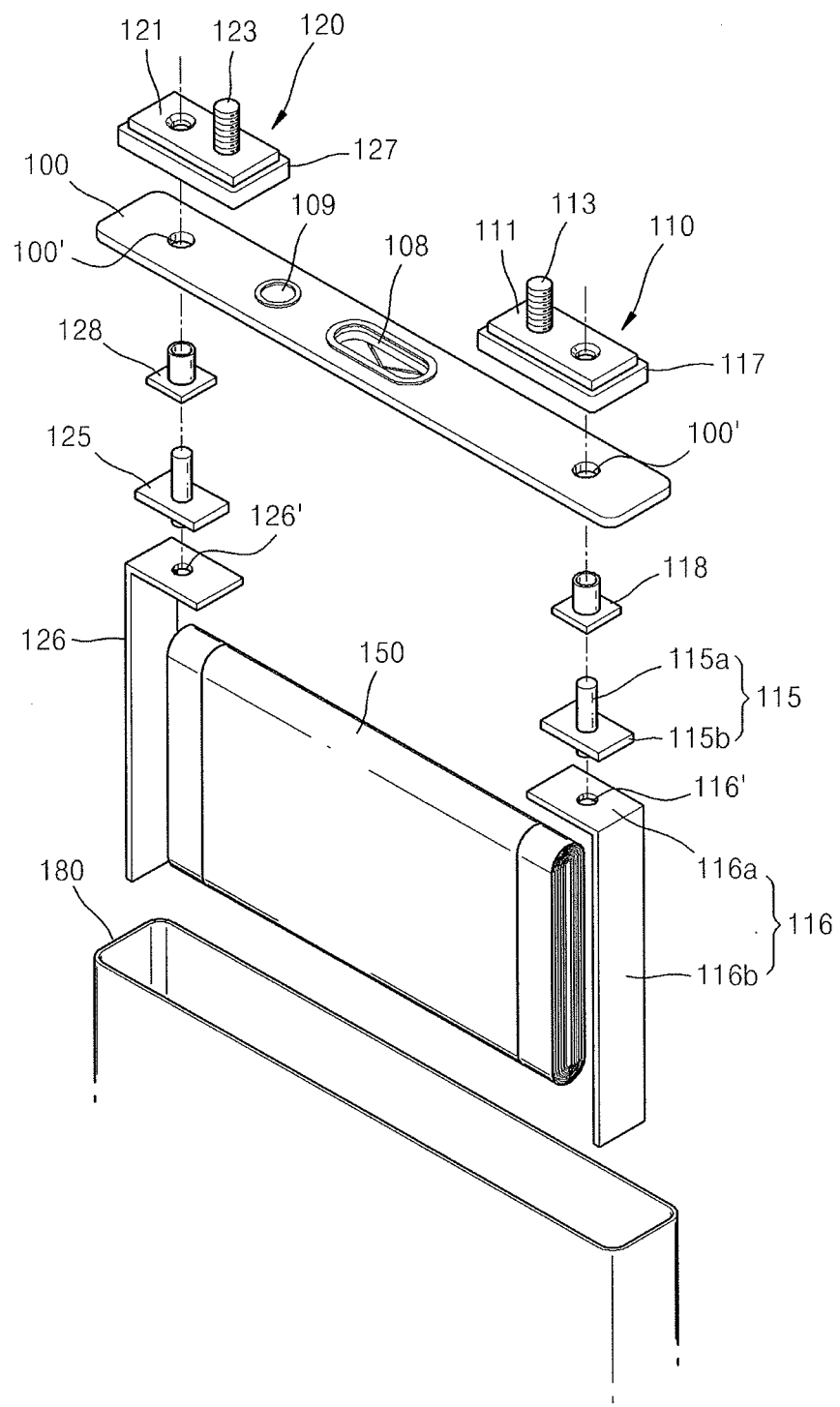
FIG. 2 illustrates an exploded perspective view of the secondary battery shown in FIG. 1.

FIG. 1 illustrates perspective view of a secondary battery according to an embodiment. FIG. 2 illustrates an exploded perspective view of the secondary battery shown in FIG. 1.

Referring to FIGS. 1 and 2, a pair of electrode terminals 110 and 120 having opposite polarities may protrude from the secondary battery. For example, first and second electrode terminals 110 and 120 may be formed. The first and second electrode terminals 110 and 120 may be electrically connected to an electrode assembly 150 accommodated inside the secondary battery. The first and second electrode terminals 110 and 120 may respectively function as a positive electrode terminal and a negative electrode terminal connected to first and second electrode plates of the electrode assembly 150, and may supply discharge power accumulated in the secondary battery to outside or receive charging power from outside. In an implementation, the first and second electrode terminals 110 and 120 may be formed at two opposite sides of the secondary battery.

According to another embodiment, a cap plate 100 of the secondary battery may be electrically connected to the electrode assembly 150 and may function as a terminal. In this case, one of the first and second electrode terminals 110 and 120 may be omitted.

Figure 3:
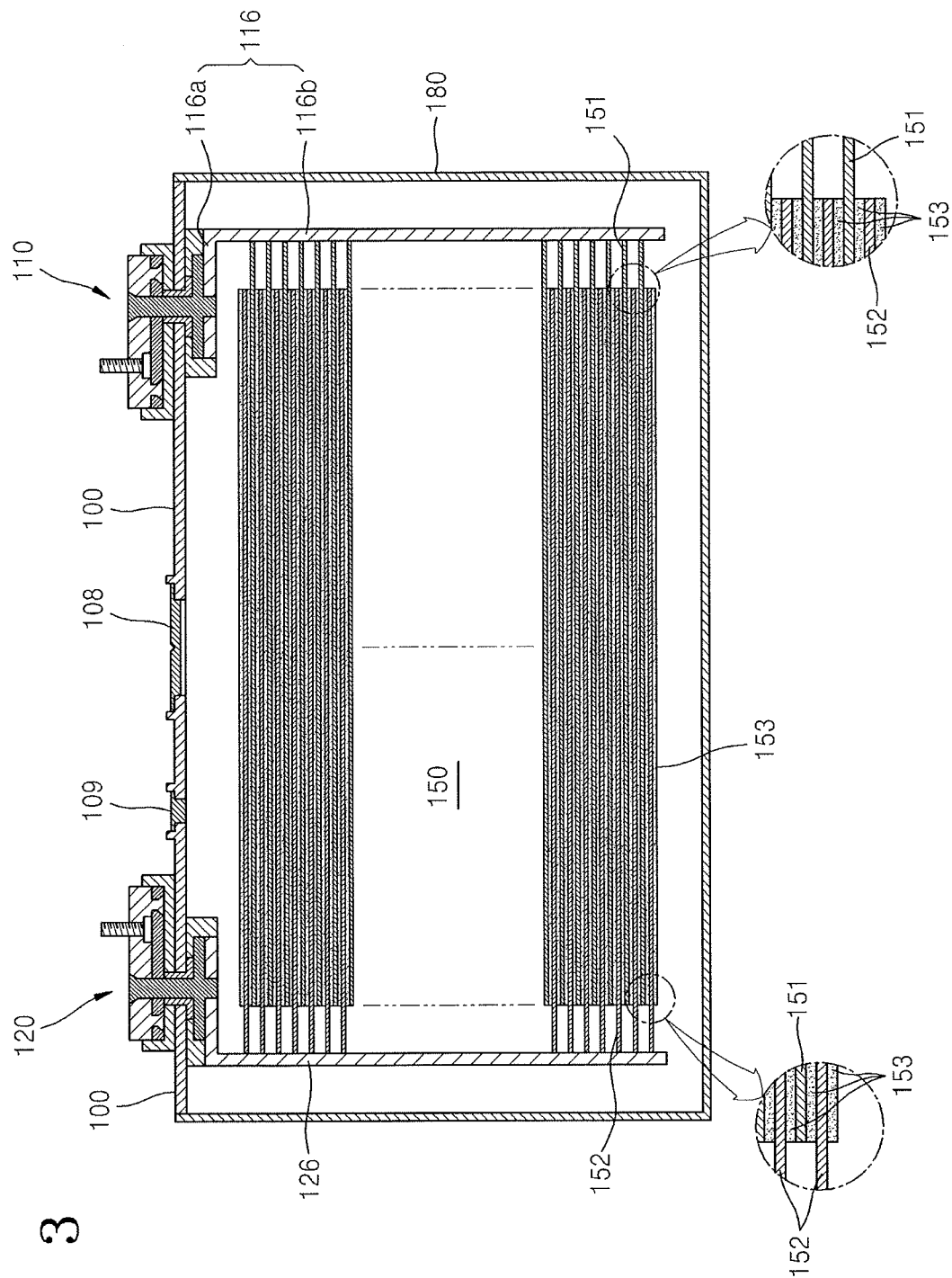
FIG. 3 illustrates a sectional view taken along a line of FIG. 1.
Figure 4:
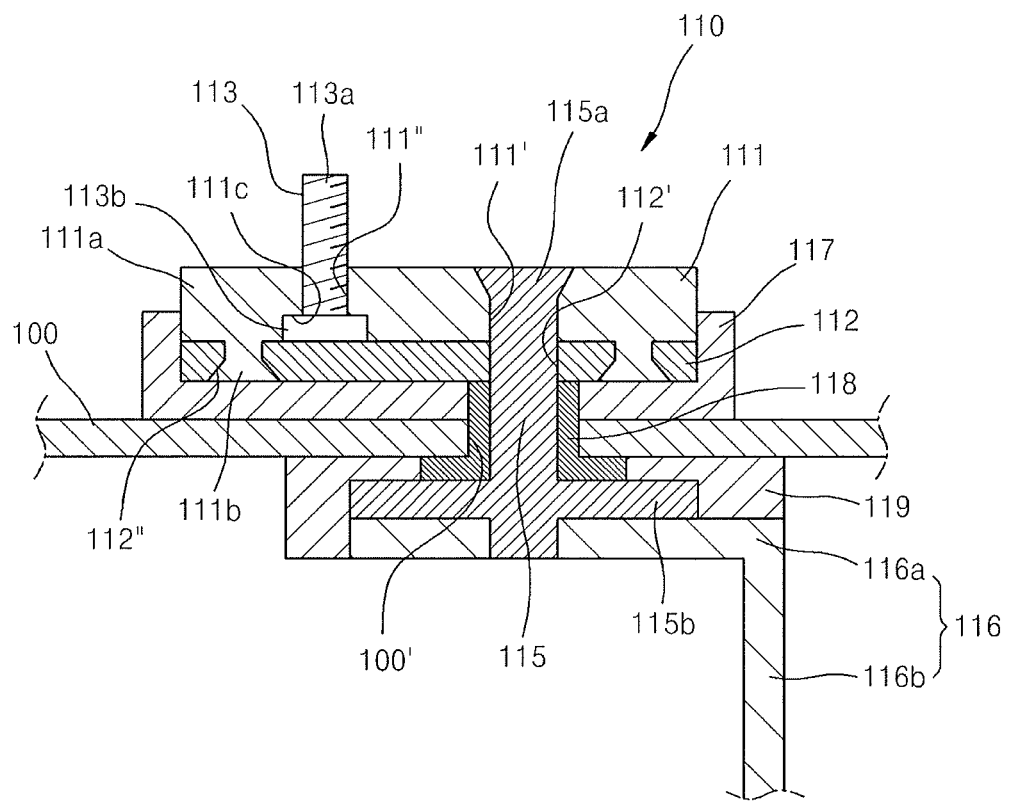
FIG. 4 illustrates an enlarged sectional view of the secondary battery shown in FIG. 3 at a side of a first electrode terminal.
Figure 5:
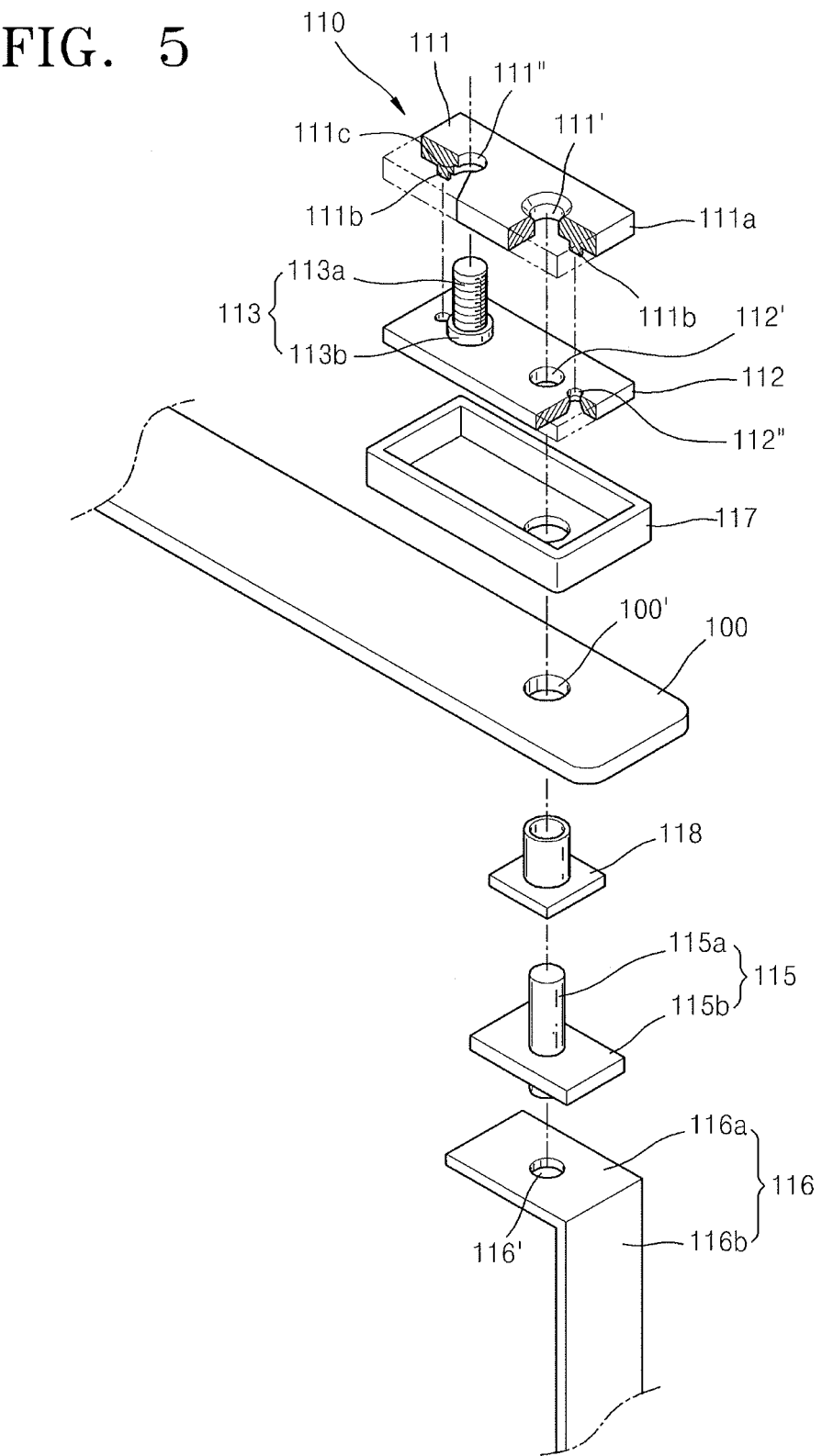
FIG. 5 illustrates an exploded perspective view of the secondary battery shown in FIG. 3 at the side of the first electrode terminal.

FIG. 3 illustrates a sectional view taken along a line of FIG. 1. FIGS. 4 and 5 illustrate a cross-sectional view and an exploded perspective view of the secondary battery shown in FIG. 3 at the side of the first electrode terminal 120.

Referring to FIG. 3, the secondary battery may include the electrode assembly 150, the first and second electrode terminals 110 and 120, and current collecting members 116 and 126 (which electrically interconnect the electrode assembly 150 and the first and second electrode terminals 110 and 120). The secondary battery may also include a case 180 (that accommodates the electrode assembly 150) and the cap plate 100 (that seals an opening of the case 180 in which the electrode assembly 150 is accommodated).

The cap plate 100 may include a vent unit 108 (that breaks to release internal pressure under an abnormal situation, e.g., in which pressure inside the case 180 exceeds a pre-set point) and a sealing unit 109 (for sealing an electrolyte inlet).

The electrode assembly 150 may be accommodated inside the case 180 of the secondary battery. The electrode assembly 150 may include first and second electrode plates 151 and 152 having opposite polarities, and a separator 153 interposed between the first and second electrode plates 151 and 152. The electrode assembly 150 may be a roll type (in which the first and second electrode plates 151 and 152 and the separator 153 are wound in the jelly-roll shape) or a stack type (in which the first and second electrode plates 151 and 152 and the separator 153 are alternately stacked). The cap plate 100 may be assembled to or coupled with the top opening of the case 180, in which the electrode assembly 150 is accommodated. Thus, the cap plate 100 may seal the electrode assembly 150 in the case 180. For electrical connection between the electrode assembly 150 and an external circuit (not shown) or between the electrode assembly 150 and an adjacent secondary battery, the first and second electrode terminals 110 and 120 (electrically connected to the electrode assembly 150) may be formed outside the cap plate 100. The first and second electrode terminals 110 and 120 may include the first electrode terminal 110 and the second electrode terminal 120 having opposite polarities, and the first and second electrode terminals 110 and 120 may be electrically connected to the first and second electrode plates 151 and 152, respectively.

The first and second electrode terminals 110 and 120 may have a substantially same structure, and technical features related to the first and second electrode terminals 110 and 120 described below may be applicable to both the first and second electrode terminals 110 and 120. However, the embodiments are not limited thereto, and the technical features described below may be selectively applied to only one of the first and second electrode terminals 110 and 120.

Hereinafter, the structure of the first electrode terminal 110 will be described first, and then the structure of the second electrode terminal 120 will be described. Referring to FIGS. 4 and 5, the first electrode terminal 110 may include a terminal plate 111 on the cap plate 100, a current collecting terminal 115 attached to a first side of the terminal plate 111, a reinforcing plate 112 attached to a second side of the terminal plate 111, and a connecting terminal 113 protruding from the top surface of the terminal plate 111.

The terminal plate 111 may be arranged on the cap plate 100. The terminal plate 111 may be electrically connected to the current collecting terminal 115 and may provide a broader terminal area than the current collecting terminal 115. The terminal plate 111 may be connected to the current collecting terminal 115 (e.g., an upper end portion 115a of the current collecting terminal 115) via, e.g., riveting. However, the embodiments are not limited thereto, and the terminal plate 111 may be connected to the current collecting terminal 115 via any of various methods, e.g., welding and screw attachment.

The current collecting terminal 115 may be connected to the first side of the terminal plate 111, and the reinforcing plate 112 may be connected to the second side of the terminal plate 111. For example, the current collecting terminal 115 may be attached to or coupled with a top surface of the terminal plate 111, an the reinforcing plate 112 may be attached to or coupled with a bottom surface of the terminal plate 111.

For example, the upper end portion 115a of the current collecting terminal 115 (which extends through a first terminal hole 111' of the terminal plate 111) may be exposed on the top surface of the terminal plate 111, and a flange structure (which expands in the horizontal or lateral direction and press-contacts the top surface of the terminal plate 111) may be formed at the exposed upper end portion 115a. The flange structure of the upper end portion 115a may be formed via riveting with respect to the upper end portion 115a of the current collecting terminal 115, which penetrate through the terminal plate 111 and is exposed on the top surface of the terminal plate 111.

Although not shown, a concave groove may be formed at the upper end portion 115a of the current collecting terminal 115 due to pressure from a processing tool (not shown) which revolves at a high speed. For example, a portion of the upper end portion 115a of the current collecting terminal 115 may be pushed in the horizontal direction by the pressure of the processing tool and may closely contact the top surface of the terminal plate 111.

The terminal plate 111 may include a combining unit 111b, which may extend downwardly from a main body 111a of the terminal plate 111 and may extend onto or be coupled with the bottom surface of the reinforcing plate 112 via a penetration hole 112" of the reinforcing plate 112. The combining unit 111b may have a flange structure that expands in the horizontal or lateral direction and press-contacts the bottom surface of the reinforcing plate 112. The flange structure of the combining unit 111b may be formed via riveting with respect to the combining unit 111b that penetrates through the reinforcing plate 112 and may be exposed on the bottom surface of the reinforcing plate 112.

Although not shown, a concave groove may be formed at the combining unit 111b of the terminal plate 111 due to pressure from a processing tool (not shown) which revolves at a high speed. For example, a portion of the combining unit 111b may be pushed in the horizontal direction by the pressure of the processing tool and closely contact the bottom surface of the terminal plate 111.

The main body 111a of the terminal plate 111 may have a plate shape and may include the first terminal hole 111' (through which the current collecting terminal 115 extends) and a second terminal hole 111'' (though which the connecting terminal 113 described below extends). A stepped portion 111c may be formed at the second terminal hole 111'' of the terminal plate 111 to help hold the connecting terminal 113 to help prevent dislocation of the connecting terminal 113.

The combining unit 111b of the terminal plate 111 may protrude downwardly from the main body 111a of the terminal plate 111. In an implementation, the terminal plate 111 may include at least two combining units 111b on the bottom surface thereof, and attachment between the terminal plate 111 and the reinforcing plate 112 may be strengthened by the plurality of combining units 111b. The combining units 111b may be inserted to the penetration holes 112'' of the reinforcing plate 112 and press portions surrounding the penetration hole 112'' of the reinforcing plate 112 to attach the terminal plate 111 to the reinforcing plate 112. The plurality of combining units 111b may firmly attach the terminal plate 111 and the reinforcing plate 112 to each other. Thus, a load applied to the terminal plate 111 may be uniformly distributed through the reinforcing plate 112, and mechanical strength of the terminal plate 111 may be reinforced by being supported by the reinforcing plate 112. For example, the at least two combining units 111b may be formed on the bottom surface of the terminal plate 111, and the attachment between the terminal plate 111 and the reinforcing plate 112 may be strengthened by the combining units 111b.

Furthermore, by closely attaching the terminal plate 111 and the reinforcing plate 112 toward each other via the plurality of combining units 111b formed at the terminal plate 111, a gap between the terminal plate 111 and the reinforcing plate 112 may be eliminated. Thus, introduction of external impurities (e.g., moisture) via the gap may be reduced and/or prevented.

The reinforcing plate 112 and the terminal plate 111 may be formed of different metals, and corrosion due to contact between different metals may occur at an interface between the reinforcing plate 112 and the terminal plate 111. In an implementation, anti-corrosion layers (not shown) may be formed on surfaces of the reinforcing plate 112 and the terminal plate 111. For example, the anti-corrosion layers may include nickel plated layers.

An upper insulation member 117 may be interposed between the terminal plate 111 and the cap plate 100. The upper insulation member 117 may insulate the terminal plate 111 from the cap plate 100. For example, the upper insulation member 117 may partially surround side surfaces of the reinforcing plate 112 and the terminal plate 111 and may surround at least the interface between the reinforcing plate 112 and the terminal plate 111 to help reduce and/or prevent the introduction of impurities, e.g., moisture, and to help reduce and/or prevent corrosions of the reinforcing plate 112 and the terminal plate 111 that may be formed of different metals. In an implementation, if the terminal plate 111 and the cap plate 100 have a same polarity, the upper insulation member 117 may be omitted.

The current collecting terminal 115 may penetrate through the cap plate 100 and may be drawn out of the cap plate 100. For example, a terminal hole 100' (into which the current collecting terminal 115 is inserted) may be formed in the cap plate 100. For example, the current collecting terminal 115 may be inserted upwardly to the cap plate 100 from below through the terminal hole 100' of the cap plate 100.

The current collecting terminal 115 may include the upper end portion 115a and a flange unit 115b that are formed in a lengthwise direction of the current collecting terminal 115. For example, the current collecting terminal 115 may be assembled to penetrate through the cap plate 100 and may include the upper end portion 115a (exposed above the cap plate 100) and the flange unit 115b (below the cap plate 100).

The upper end portion 115a of the current collecting terminal 115 may fix a position of the current collecting terminal 115, and may be fixed with respect to the top surface of the first electrode terminal 110 via, e.g., riveting. For example, the upper end portion 115a may form a flange structure that expands from the current collecting terminal 115 in the horizontal or lateral direction and may be fixed to or coupled with the top surface of the terminal plate 111. Although not shown, a concave groove may be formed at the upper end portion 115a of the current collecting terminal 115 due to pressure from a processing tool (not shown) that revolves at a high speed. For example, a portion of the upper end portion 115a of the current collecting terminal 115 maybe pushed in the horizontal direction by the pressure of the processing tool, and may closely contact the top surface of the terminal plate 111.

The flange unit 115b of the current collecting terminal 115 may have a flange structure that has a larger diameter or dimension than the terminal hole 100' to prevent the current collecting terminal 115 from being separated from the cap plate 100 via the terminal hole 100'. For example, the current collecting terminal 115 may be inserted into the terminal hole 100' from below the cap plate 100, and, while being fixed to the bottom of the cap plate 100 by the flange unit 115b, the upper end portion 115a (exposed on the top of the cap plate 100) may be riveted, thereby fixing the current collecting terminal 115.

The current collecting terminal 115 may be electrically insulated from the cap plate 100 and may be inserted into the terminal hole 100' of the cap plate 100. For example, a seal gasket 118 may be inserted into the terminal hole 100', and the current collecting terminal 115 may be inserted into the terminal hole 100' via the seal gasket 118, thereby insulating the current collecting terminal 115 from the cap plate 100. The seal gasket 118 may seal around the terminal hole 100' to help prevent leakage of electrolyte in the case 180 and introduction of external impurities.

A bottom insulation member 119 may be interposed between the current collecting terminal 115 and the cap plate 100. For example, the bottom insulation member 119 may insulate the current collecting terminal 115 from the cap plate 100. As described above, the current collecting terminal 115 and the cap plate 100 may be insulated from each other by arranging the seal gasket 118 around the terminal hole 100' (through which the current collecting terminal 115 extends) and arranging the bottom insulation member 119 between the current collecting terminal 115 and the cap plate 100. For example, the bottom insulation member 119 may extend between a current collecting member 116 and the cap plate 100.

The current collecting terminal 115 may be electrically connected to the electrode assembly 150 via the current collecting member 116. The current collecting member 116 may include a current collecting plate 116b (which constitutes the lower portion of the current collecting member 116 and is attached to the electrode assembly 150), and a lead unit 116a (which constitutes an upper portion of the current collecting member 116 and is attached to the current collecting terminal 115).

The current collecting plate 116b may be attached to two opposite ends of the electrode assembly 150 and may be welded to non-coated end portions of the electrode assembly 150, e.g., non-coated portions of the first and second electrode plates 151 and 152 on which electrode active material is not formed.

The lead unit 116a may extend in a direction perpendicular to the current collecting plate 116b (to face the current collecting terminal 115) and may be attached to the current collecting terminal 115. For example, a penetration hole (116' of FIG. 5) (into which the current collecting terminal 115 is inserted) may be formed in the lead unit 116a, and the current collecting member 116 and the current collecting terminal 115 may be attached to each other by welding around the lead unit 116a and the current collecting terminal 115 inserted to the penetration hole 116'.

The first electrode terminal 110 may include the reinforcing plate 112, which is attached to the terminal plate 111 to reinforce strength of the terminal plate 111. For example, if the current collecting terminal 115 is attached to one side of the terminal plate 111, e.g., the top of the terminal plate 111, the reinforcing plate 112 may be attached to another side of the terminal plate 111, e.g., the bottom of the terminal plate 111.

The reinforcing plate 112 may have a substantially plate shape. The reinforcing plate 112 may be arranged below the terminal plate 111 and may be attached to face the terminal plate 111. For example, the reinforcing plate 112 may be arranged below the terminal plate 111 to face the terminal plate 111, and the reinforcing plate 112 and the terminal plate 111 may be attached to each other by expanding the combining unit 111b of the terminal plate 111 exposed by the penetration hole 112" of the reinforcing plate 112 to closely contact the bottom surface of the reinforcing plate 112 via riveting.

For example, a flange structure of the combining unit 111b of the terminal plate 111 may closely attach the terminal plate 111 and the reinforcing plate 112 to each other by pressing portions of the reinforcing plate 112 around the penetration hole 112". Although riveting is exemplified for attachment between the reinforcing plate 112 and the terminal plate 111, the embodiments are not limited thereto, and any of various other attachment methods, e.g., welding, screw attachment, caulking, spinning, and pressure between a convex portion and a concave portion, may be applied thereto.

The reinforcing plate 112 may be formed of a material having superior strength compared with the material constituting the terminal plate 111, to thereby reinforce the mechanical strength of the terminal plate 111. For example, if the terminal plate 111 is formed of copper or aluminum, the reinforcing plate 112 may be formed of a stainless steel (SUS). For example, the reinforcing plate 112 and the terminal plate 111 may be formed of different metals. Thus, corrosion due to contact between different metals may occur at the interface between the reinforcing plate 112 and the terminal plate 111. Therefore, anti-corrosion layers (not shown) may be formed on surfaces of the reinforcing plate 112 and the terminal plate 111. For example, the anti-corrosion layers may include nickel plated layers.

The reinforcing plate 112 may help reinforce the mechanical strength of the terminal plate 111, may have a size corresponding to the terminal plate 111, and may be arranged to face the terminal plate 111. If the reinforcing plate 112 were to be smaller than the terminal plate 111, load applied to the terminal plate 111 may not be sufficiently supported. It is not necessary to form the reinforcing plate 112 to be larger than the terminal plate 111.

The terminal hole 112' (through which the current collecting terminal 115 extends) may be formed in the reinforcing plate 112. The current collecting terminal 115 (protruding from the top surface of the cap plate 100 to a predetermined length) may extend through the terminal hole 112' of the reinforcing plate 112 and the first terminal hole 111' of the terminal plate 111 in the order stated, may be exposed on the top surface of the terminal plate 111, and may press-contact the top surface of the terminal plate 111 via the upper end portion 115a of the current collecting terminal 115.

The connecting terminal 113 may be formed on the reinforcing plate 112. The connecting terminal 113 may form, e.g., an electric connection between a secondary battery and an external circuit (not shown), or an electric connection between a secondary battery and an adjacent secondary battery in a modules structure in which a plurality of secondary batteries are electrically connected. Therefore, the connecting terminal 113 may be formed of a metal having electric conductivity, and ultimately, may be electrically connected to the electrode assembly 150. For example, the connecting terminal 113 may be connected to the current collecting terminal 115 via the terminal plate 111, and the connecting terminal 113 may be electrically connected to the current collecting terminal 115 via the reinforcing plate 112 and terminal plate 111. For example, the connecting terminal 113 and the reinforcing plate 112 may be formed as a single body and may be formed of a same metal as the reinforcing plate 112. In an implementation, the connecting terminal 113 may be formed of a SUS. According to another embodiment, the connecting terminal 113 may be separated from the reinforcing plate 112. However, even in this case, the connecting terminal 113 and the reinforcing plate 112 may be formed of a same metal to help reduce corrosion at the interface between the connecting terminal 113 and the reinforcing plate 112 and to help reduce electric contact resistance.

A spiral groove for screw attachment may be formed at an upper end portion 113a of the connecting terminal 113 exposed on the top surface of the terminal plate 111. For example, in a module structure in which a plurality of secondary batteries are electrically connected, the connecting terminal 113 may be connected to the connecting terminal 113 of an adjacent secondary battery in series/in parallel. A bus bar (not shown) may be attached via the spiral groove formed at the connecting terminal 113. For example, the bus bar may be attached to the connecting terminal 113 and a nut (not shown) may be screw-attached to the spiral groove of the connecting terminal 113 protruding from the bus bar, thereby fixing the bus bar.

The connecting terminal 113 may be arranged on the reinforcing plate 112, may extend through the second terminal hole 111" of the terminal plate 111, and may protrude from the top surface of the terminal plate 111 to a predetermined length. The connecting terminal 113 may include a flange unit 113b having a substantially uniform cross-sectional expanding from the cross-section of the main body and functions as a stopper to prevent the connecting terminal 113 from being separated via the second terminal hole 111" of the terminal plate 111. For example, the connecting terminal 113 may be inserted into the second terminal hole 111" of the terminal plate 111 from below the terminal plate 111, and the flange unit 113b of the connecting terminal 113 may be closely attached to the stepped portion 111c of the second terminal hole 111" to stop further movement of the connecting terminal 113. Therefore, a position of the connecting terminal 113 may be fixed.

The connecting terminal 113 and the reinforcing plate 112 may be assembled together from below the terminal plate 111. For example, while the connecting terminal 113 and the reinforcing plate 112 are fixed to each other, e.g., the connecting terminal 113 and the reinforcing plate 112 are formed as a single body, the connecting terminal 113 and the reinforcing plate 112 may be assembled to the terminal plate 111 from below the terminal plate 111. According to another embodiment, the connecting terminal 113 and the reinforcing plate 112 may be separated from each other. The connecting terminal 113 may first be assembled from below the terminal plate 111, and then the reinforcing plate 112 may be assembled from below the terminal plate 111 to overlap the connecting terminal 113. After the connecting terminal 113 and the reinforcing plate 112 are assembled to the terminal plate 111, attachment may be made via riveting between the reinforcing plate 112 and the terminal plate 111, and thus the connecting terminal 113, the reinforcing plate 112, and the terminal plate 111 may be attached to a single structure. Next, the current collecting terminal 115 may be inserted into the assembly including the connecting terminal 113, the reinforcing plate 112, and the terminal plate 111 and the current collecting terminal 115 may be combined with the assembly 111, 112, and 113 by performing riveting to the upper end portion 115a of the current collecting terminal 115 exposed on the top surface of the assembly 111, 112, and 113. As a result, the electrode terminal 110 as shown in FIG. 4 may be formed.

Figure 6:
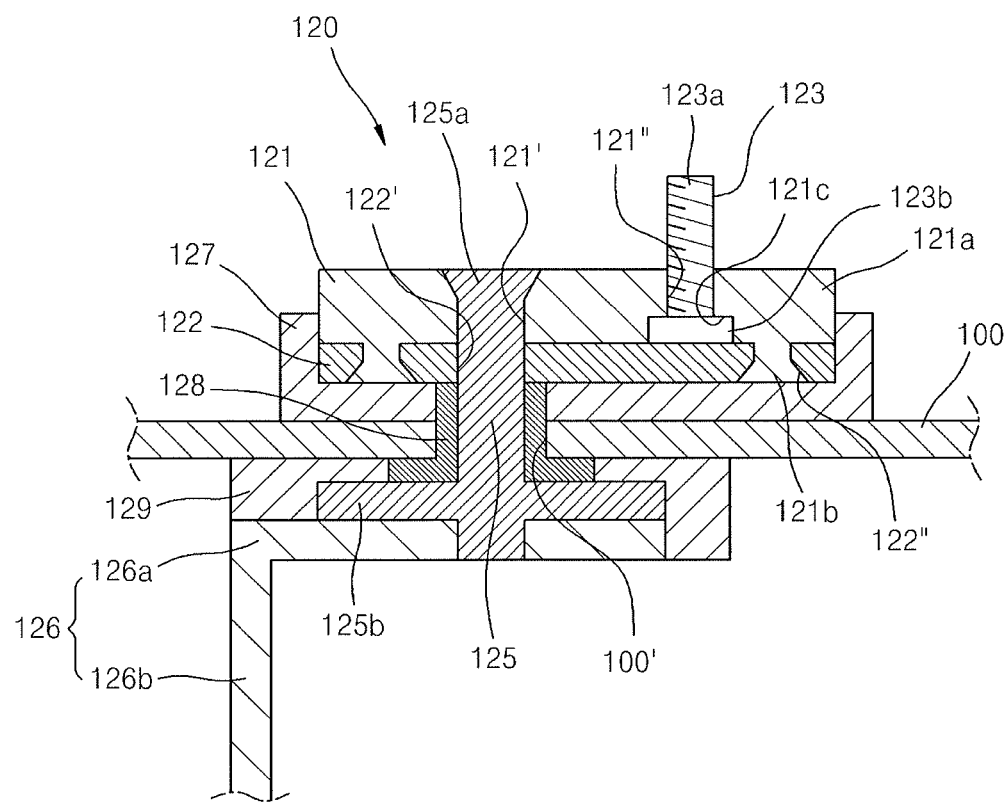
FIG. 6 illustrates a cross-sectional view of the secondary battery shown in FIG. 3 at a side of a second electrode terminal.

FIG. 6 illustrates a cross-sectional view of the secondary battery shown in FIG. 3 at the side of the second electrode terminal 120. Referring to FIG. 6, the second electrode terminal 120 may have the substantially same (or similar) structure as the first electrode terminal 110 described above with reference to FIGS. 4 and 5. For example, the second electrode terminal 120 may include a terminal plate 121 arranged on the cap plate 100 via an upper insulation member 127, a current collecting terminal 125 extending through a first terminal hole 121' of the terminal plate 121 and attached to the top surface of the terminal plate 121, and a reinforcing plate 122 attached to the bottom surface of the terminal plate 121 and combined or coupled with the terminal plate 121 via combining units 121b protruding downwardly from a main body 121a of the terminal plate 121. Furthermore, the second electrode terminal 120 may include a connecting terminal 123 arranged on the reinforcing plate 122 and exposed on the terminal plate 121 via a second terminal hole 121" of the terminal plate 121.

The current collecting terminal 125 may include a upper end portion 125a having a flanged shape (contact-pressing the top surface of the terminal plate 121) and a flange unit 125b that expands in the horizontal direction (to help prevent the current collecting terminal 125 from being separated via the terminal hole 100' of the cap plate 100). In an implementation, the connecting terminal 123 may include an upper end portion 123a at which a spiral groove is formed and a flange unit 123b which is configured to be stopped by a stepped portion 121c of the second terminal hole 121" to stop further movement of the connecting terminal 123.

Furthermore, technical features of a current collecting member 126 connected to the current collecting terminal 125 and including a current collecting plate 126b and a current collecting plate 126b, a terminal hole 122' of the reinforcing plate 122 through which the current collecting terminal 125 extends, a penetration hole 122" of the reinforcing plate 122 through which the combining unit 121b of the terminal plate 121 extend, a seal gasket 128 formed around the terminal hole 100' through which the current collecting terminal 125 extends, and a bottom insulation member 129 may be substantially the same as those of the corresponding components described above. Therefore, repeated detailed description thereof may be omitted below.

Figure 7:
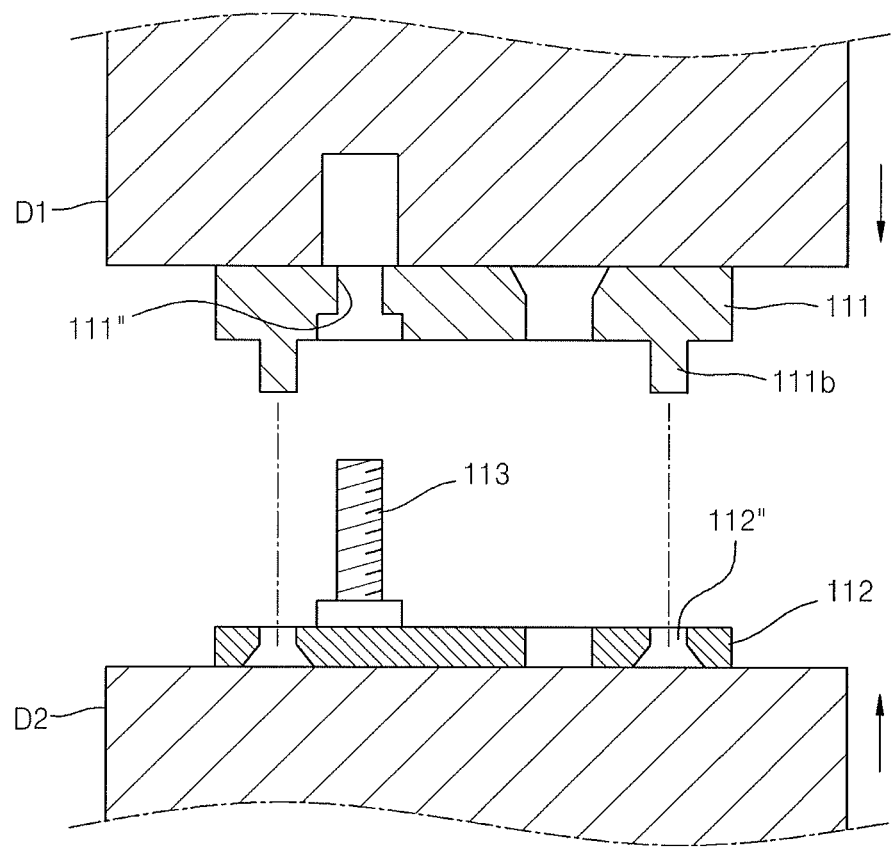
FIGS. 7 and 8 illustrate diagrams for describing operations for manufacturing an electrode terminal of a secondary battery according to an embodiment.
Figure 8:
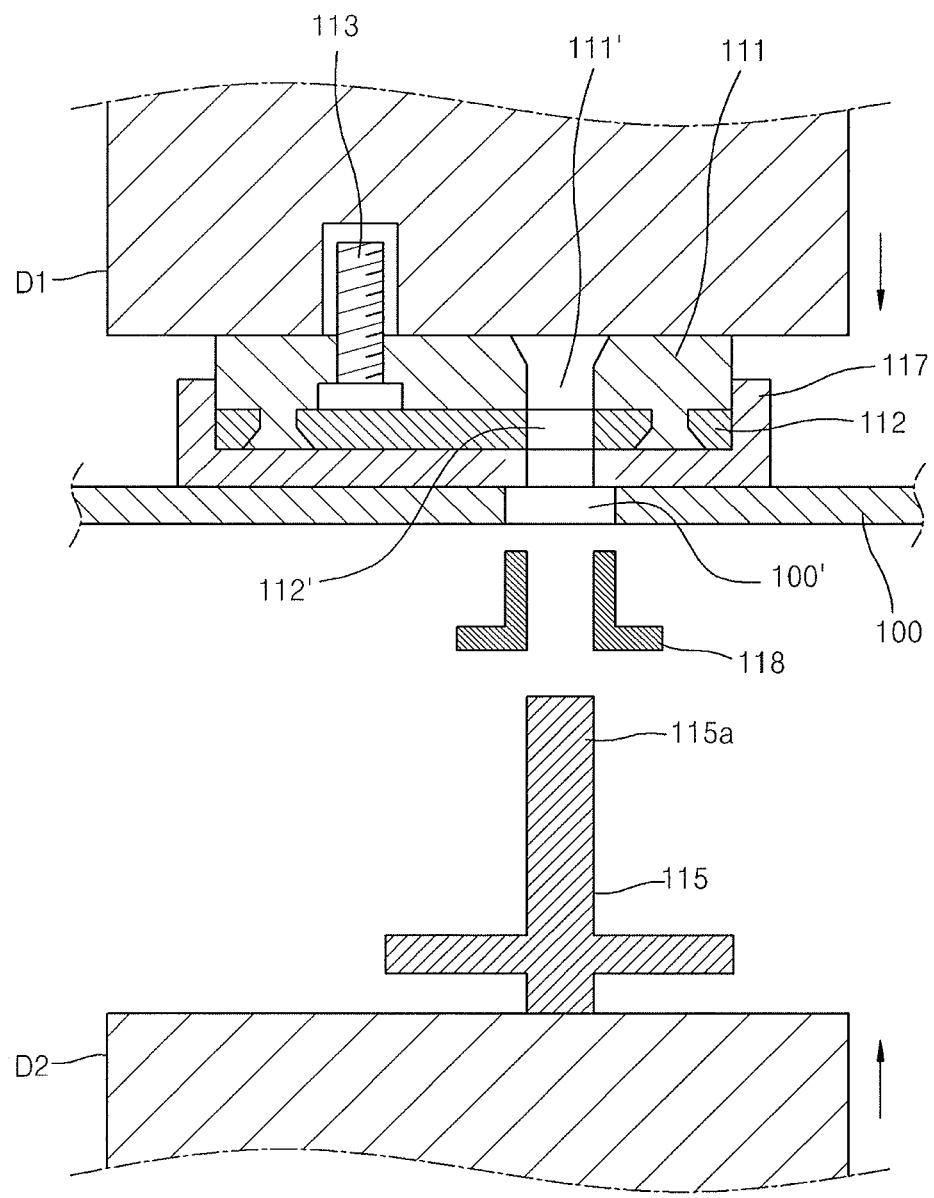

FIGS. 7 and 8 illustrate diagrams for describing operations for manufacturing an electrode terminal of a secondary battery according to an embodiment. Hereinafter, formation of the first electrode terminal 110 will be described below. However, the technical features described below may be applied to formation of the second electrode terminal 120 in substantially the same regard.

Referring to FIG. 7, the reinforcing plate 112, which may include the connecting terminal 113 and the reinforcing plate 112 integrally formed with each other, may be assembled from below the terminal plate 111. For example, the terminal plate 111 and the reinforcing plate 112 may be assembled to face each other, such that the combining unit 111b protruding from the bottom surface of the terminal plate 111 are inserted to the penetration hole 112" of the reinforcing plate 112. Next, the combining unit 111b (which has a flanged structure and press-contacts the bottom surface of the reinforcing plate 112) may be formed either by riveting the bottom of the combining unit 111b exposed on the bottom surface of the reinforcing plate 112 via the penetration hole 112" of the reinforcing plate 112 or by pressing upper and low dies D1 and D2. Here, the flange structure of the combining unit 111b may press portions of the reinforcing plate 112 around the penetration hole 112" to combine the terminal plate 111 and the reinforcing plate 112 with each other.

Next, as shown in FIG. 8, the assembly including the terminal plate 111 and the reinforcing plate 112 may be fixed on the cap plate 100. Here, the assembly including the terminal plate 111 and the reinforcing plate 112 may be combined with the current collecting terminal 115 protruding from the top surface of the cap plate 100 to a predetermined length, and the assembly including the terminal plate 111 and the reinforcing plate 112 may be fixed onto the cap plate 100 via the current collecting terminal 115.

For example, the assembly including the terminal plate 111 and the reinforcing plate 112 may be arranged on the cap plate 100. The assembly including the terminal plate 111 and the reinforcing plate 112 may be arranged on the upper insulation member 117. Here, the current collecting terminal 115 protruding from the top surface of the cap plate 100 to a predetermined length and the terminal holes 111' and 112' may be mutually aligned, and the current collecting terminal 115 may penetrate through the assembly including the terminal plate 111 and the reinforcing plate 112 via the first terminal holes 111' and 112'. Thus, the current collecting terminal 115 may be exposed on the top surface of the terminal plate 111. Next, the upper end portion 115a of the current collecting terminal 115 (having a flange structure press-contacting the top surface of the terminal plate 111)

may be formed, e.g., by riveting the upper end portion 115a of the current collecting terminal 115 exposed on the top surface of the terminal plate 111 or by pressing upper and low dies D1 and D2. Here, the flange structure of the upper end portion 115a may press portions of the terminal plate 111 around the first terminal hole 111' to fix the assembly including the terminal plate 111 and the reinforcing plate 112 onto the cap plate 100.

The embodiments provide a secondary battery in which durability of a terminal plate constituting an electrode terminal is improved.

As described above, according to the embodiments, strength of a terminal plate constituting an electrode terminal of a secondary battery may be reinforced. Therefore, in a module in which a plurality of secondary batteries are electrically connected to one another, deformation of a terminal plate that may occur during attachment of a bus bar for electrically connecting secondary batteries adjacent to one another or electric connection of secondary batteries to an external circuit or an external load. Therefore, electric resistance between a secondary battery and an adjacent secondary battery or electric resistance between a secondary battery and an external circuit or an external load may be reduced. Therefore, output characteristics of a secondary battery may be improved ultimately.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A secondary battery, comprising:
an electrode assembly;
a case accommodating the electrode assembly;
a cap plate sealing the case;
a conductive terminal plate on the cap plate;
a current collecting terminal penetrating through the cap plate and the conductive terminal plate, the current collecting terminal being coupled with a top surface of the conductive terminal plate and being electrically connected to the electrode assembly;
a reinforcing plate coupled with a bottom surface of the conductive terminal plate to face the conductive terminal plate, the conductive terminal plate being electrically connected to the current collecting terminal; and
an insulation member between the cap plate and the reinforcing plate,
wherein the conductive terminal plate includes:
a main body facing the reinforcing plate; and
at least one combining unit protruding from the main body, the at least one combining unit penetrating through the reinforcing plate and including a flange structure that contacts a top surface of the insulation member.

2. The secondary battery as claimed in claim 1, wherein the reinforcing plate has a plate shape.

3. The secondary battery as claimed in claim 1, wherein the reinforcing plate includes a metal different from a metal that constitutes the conductive terminal plate.

4. The secondary battery as claimed in claim 1, wherein the current collecting terminal:
penetrates through, in an order as follows: the cap plate, the reinforcing plate, and the conductive terminal plate, and
includes a portion that is exposed on the top surface of the conductive terminal plate.

5. The secondary battery as claimed in claim 1, wherein an upper end portion of the current collecting terminal includes a flange structure that expands in a lateral direction and press-contacts the top surface of the conductive terminal plate.

6. The secondary battery as claimed in claim 5, wherein the flange structure is formed by riveting the upper end portion of the current collecting terminal.

7. The secondary battery as claimed in claim 1, wherein the combining unit:
protrudes toward the bottom surface of the reinforcing plate via the penetration hole of the reinforcing plate.

8. The secondary battery as claimed in claim 7, wherein the flange structure is formed by riveting the combining unit of the conductive terminal plate.

9. The secondary battery as claimed in claim 1, wherein the conductive terminal plate includes at least two combining units, the at least two combining units being formed at different locations on the conductive terminal plate.

10. A secondary battery, comprising:
an electrode assembly;
a case accommodating the electrode assembly;
a cap plate sealing the case;
a conductive terminal plate on the cap plate;
a current collecting terminal penetrating through the cap plate and the conductive terminal plate, the current collecting terminal being coupled with a top surface of the conductive terminal plate and being electrically connected to the electrode assembly;
a reinforcing plate coupled with a bottom surface of the conductive terminal plate to face the conductive terminal plate;
a connecting terminal on the reinforcing plate, the connecting terminal penetrating through the conductive terminal plate and including a portion that is exposed on the top surface of the conductive terminal plate; and
an insulation member between the cap plate and the reinforcing plate,
wherein the conductive terminal plate includes:
a main body facing the reinforcing plate; and
at least one combining unit protruding from the main body, the at least one combining unit penetrating through the reinforcing plate and contacting a top surface of the insulation member.

11. The secondary battery as claimed in claim 10, wherein an upper end portion of the connecting terminal protruding from the top surface of the conductive terminal plate includes a spiral groove for screw attachment.

12. The secondary battery as claimed in claim 10, wherein the connecting terminal is formed of a same metal as that of the reinforcing plate.

13. The secondary battery as claimed in claim 10, wherein the connecting terminal is integrated with the reinforcing plate as a single body.

14. The secondary battery as claimed in claim 1, wherein the current collecting terminal:

penetrates through the conductive terminal plate,
press-contacts the top surface of the conductive terminal plate, and
is coupled with the conductive terminal plate.

15. The secondary battery as claimed in claim 1, wherein the reinforcing plate is interposed between the conductive terminal plate and the cap plate.

16. The secondary battery as claimed in claim 1, wherein:
the reinforcing plate is assembled from below the conductive terminal plate, and
the combining unit protruding from the bottom surface of the conductive terminal plate penetrates through the reinforcing plate and combines the reinforcing plate and the conductive terminal plate to each other.

17. The secondary battery as claimed in claim 1, wherein the insulation member surrounds side surfaces of an interface between the reinforcing plate and the conductive terminal plate.

* * * * *